United States Patent
Le Roux et al.

(10) Patent No.: US 11,462,211 B2
(45) Date of Patent: Oct. 4, 2022

(54) SYSTEM AND METHOD FOR DETECTING ADVERSARIAL ATTACKS

(71) Applicant: Mitsubishi Electric Research Laboratories, Inc., Cambridge, MA (US)

(72) Inventors: Jonathan Le Roux, Arlington, MA (US); Tejas Jayashankar, Cambridge, MA (US); Pierre Moulin, Urbana, IL (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 126 days.

(21) Appl. No.: 16/844,826

(22) Filed: Apr. 9, 2020

(65) Prior Publication Data
US 2021/0319784 A1    Oct. 14, 2021

(51) Int. Cl.
| | | |
|---|---|---|
| *G10L 15/16* | (2006.01) | |
| *G06F 17/16* | (2006.01) | |
| *G06K 9/62* | (2022.01) | |
| *G06N 3/08* | (2006.01) | |
| *G10L 15/22* | (2006.01) | |

(52) U.S. Cl.
CPC .............. *G10L 15/16* (2013.01); *G06F 17/16* (2013.01); *G06K 9/6215* (2013.01); *G06N 3/08* (2013.01); *G10L 15/22* (2013.01); *G10L 2015/225* (2013.01)

(58) Field of Classification Search
CPC ... G10L 15/16; G10L 15/22; G10L 2015/225; G06F 17/16; G06K 9/6215; G06N 3/08
See application file for complete search history.

(56) References Cited

U.S. PATENT DOCUMENTS

2019/0238568 A1    8/2019    Goswami et al.

FOREIGN PATENT DOCUMENTS

| CA | 3000166 A1 | * | 10/2018 | ........... G06K 9/6267 |
| CN | 110444208 A | * | 11/2019 | |
| CN | 111564154 A | * | 8/2020 | ............. G10L 15/16 |

OTHER PUBLICATIONS

Towards Resistant Audio Adversarial Examples, Publishing Venue: SPAI 20: Proceedings of the 1st ACM Workshop on Security and Privacy on Artificial IntelligenceOct. 2020 pp. 3-10 Authors: Dörr, Tom • Markert, Karla • Müller, Nicolas M. • Böttinger, Konstantin (Year: 2020).*

(Continued)

*Primary Examiner* — Mohammad K Islam
(74) *Attorney, Agent, or Firm* — Gennadiy Vinokur; Hironori Tsukamoto

(57) ABSTRACT

A linguistic system for transcribing an input, where the linguistic system comprises a processor configured to execute a neural network multiple times while varying weights of at least some nodes of the neural network to produce multiple transcriptions of the input. Further, determine a distribution of pairwise distances of the multiple transcriptions; determine a legitimacy of the input based on the distribution; and transcribe the input using stored weights of the nodes of the neural network when the input is determined as legitimate to produce a final transcription of the input.

18 Claims, 6 Drawing Sheets

(56) References Cited

OTHER PUBLICATIONS

Novel Defense Method against Audio Adversarial Example for Speech-to-Text Transcription Neural Networks, Published in: 2019 IEEE 11th International Workshop on Computational Intelligence and Applications (IWCIA) (pp. 115-120) Authors: Keiichi Tamura • Akitada Omagari • Shuichi Hashida [+details] (Year: 2019).*

Detecting Audio Adversarial Examples with Logit Noising Namgyu Park namgyu.park@postech.ac.kr POSTECH Pohang, South Korea (Year: 2021).*

Adversarial Audio Attacks that Evade Temporal Dependency Publication Date: Dec. 1, 2020, Authors: Heng Liu • Gregory Ditzler (Year: 2020).*

NeuralAS: Deep Word-Based Spoofed URLs Detection Against Strong Similar Samples Jing Ya, Tingwen Liu, (Year: 2019).*

Zeng et al. "A Multiversion Programming Inspired Approach to Detecting Audio Adversarial Example."

Zhang et al., "DefendingAdversarialAttacksonCloud-aidedAutomatic SpeechRecognitionSystems." © 2019 Copyrightheldbytheowner/author(s).PublicationrightslicensedtoACM. ACMISBN978-1-4503-6788-2/19/07 SCC 19, Jul. 8, 2019, Auckland, New Zealand.

Esmaeilpour et al., "A Robust Approach for Securing Audio Classification Against Adversarial Attacks." IEEE Transactions on Information Forensics and Security, vol. X, No. X, Nov. 2019.

* cited by examiner

Table 2

SYSTEM AND METHOD FOR DETECTING ADVERSARIAL ATTACKS

TECHNICAL FIELD

This invention generally relates to speech recognition, and more specifically to a method and a system for detecting adversarial audio attacks on automatic speech recognition systems with dropout uncertainty.

BACKGROUND

With the advent of neural networks, various linguistic systems have been developed. Linguistic systems use neural networks to enable communication between machines and humans. The neural networks are trained to predict outputs for given inputs. For example, a neural network used to transcribe audio signal may be trained extensively, before its deployment, on different audio samples to generate transcriptions corresponding to the audio samples. With knowledge of internal architecture of the linguistic systems using the neural networks, an adversarial input can be developed that can be used to manipulate the linguistic system to produce malicious output or illegitimate output. For example, a small and imperceptible optimized perturbation to an image can cause misclassification by neural networks trained to classify the images. These manipulations of the linguistic systems using adversarial inputs are referred to as adversarial attacks.

Similar adversarial attacking methodology has been extended to non-image tasks, such as automatic speech recognition (ASR). It has been observed that, by adding small and inaudible noise to a benign audio waveform, audio adversarial examples can successfully manipulate the transcribed results of an ASR system. Thus, neural networks based linguistic systems are vulnerable to these adversarial attacks.

Accordingly, there is a need to develop adversarial defense techniques to detect and provide effective defenses against the adversarial attacks.

SUMMARY

Embodiments of the present disclosure relate to systems and methods for detecting adversarial attacks on a linguistic system and providing a defense against such adversarial attacks. The linguistic system is implemented using a neural network. The linguistic system may be used in image domain to classify an input image and provide captions to the input image based on the content of the input image. Further, the linguistic system may be used in audio domain to provide transcription for an audio input. The adversarial attacks on images manipulate the linguistic system to misclassify the images and provide malicious or illegitimate captions to the image. Currently, these adversarial attacks have propagated from the image domain to the audio domain. The adversarial attack on the audio provided as input to the linguistic system manipulates the linguistic system to provide malicious or illegitimate transcriptions for the audio input. Defense mechanisms against adversarial attacks are available in the image domain for image classification, however, these mechanisms are not readily available for use in linguistic systems, e.g., in audio domain, because processing of the audio signals is more complex and tedious.

In general, some embodiments are based on the recognition that adversarial attacks on audio signals can be detected using a dropout mechanism or dropout. Dropout is a regularization technique that is typically used at training time to make neural networks robust to different inputs. Dropout results in the deactivation of a certain number of neurons in a layer, i.e., the weights corresponding to the neurons are set to zero. In each training iteration, a layer with dropout probability p drops neurons uniformly at random with probability p or retains them with probability 1−p. During testing/inference, dropout is typically turned off, and the learned weight matrices are scaled by p so that the expected value of an activation is the same as in the training stages. Intuitively, dropout enables the neural network to learn various internal representations for the same input and output pair.

Adversaries typically exploit loopholes within a network by crafting an input perturbation such that small finely-tuned differences accumulate within the network to eventually result in a malicious output. Since these adversarial attacks are often created based on knowledge of the underlying architecture of the model, some embodiments are based on the recognition that such attacks may be disarmed by perturbing that architecture via a random process like dropout.

The dropout mechanism classifies the input audio signal multiple times. For each execution of the classification, the dropout mechanism randomly selects some nodes of the neural network and removes them along with all of their incoming and outgoing connections. In such a manner, each classification uses a different set of nodes and, thus, produces different output. When used at training time, the dropout makes neural network layers co-adapt in order to correct mistakes from prior layers, in turn making the model more robust to noise and other variations in natural inputs, leading to stable outputs regardless of the randomly selected node dropping at a particular instance of utilization of the dropout mechanism. But the carefully-crafted perturbations occurring in adversarial attacks are typically different from naturally occurring variations in a normal input. Thus, when used at test time, dropout can result in large variations of the output depending on the randomly selected nodes to be dropped.

However, using dropout mechanism for classification in the image domain produces outputs that have the same size and are compared with each other to detect an attack. Because the outputs are of the same size, their comparison is easily achieved. The rationale behind such detection is that legitimate inputs (i.e. images without any perturbations) would result in almost identical outputs due to the small rate of dropout nodes. However, using the linguistic system trained with dropout mechanism in the audio domain may produce transcriptions of different lengths. This is because even small variations in weights of the transcribing neural network can produce significant variations in resulting transcriptions even for a legitimate audio input, as transcription is a linguistic process that uses a set of rules that define how spoken language is to be represented in written symbols. Hence, variations of the outputs of the transcribing neural network combined with linguistic rules can result in different outputs having different values and even different number of symbols. Therefore, unlike the classification in image domain, the relationship between dropouts and some characteristics of the outputs of neural network with dropouts in the audio domain, such as length, is not guaranteed to be stable. Hence, in the audio domain, it is uncertain whether there is a stable relationship between the dropouts and outputs of neural network using the dropout mechanism.

However, based on some testing and experimentations, some embodiments identify a structure of a linguistic system that is stable to dropout mechanism. As used herein, the linguistic system is stable to dropout mechanism when there is a stable relationship between multiple outputs of the legitimate input processed with dropout mechanism, which is different from relationships between outputs of illegitimate input. The proposed linguistic system comprises a neural network that may be implanted as a transcribing system. The neural network can produce transcription of an input signal. The input signal may be an audio, a video signal or an image. In one embodiment, the input signal includes speech utterance.

To determine the relationship between an input signal and corresponding outputs of the linguistic system, the linguistic system on reception of the input signal, executes the neural network multiple times to produce multiple transcriptions corresponding to the input signal. The number of times the neural network is executed depends on a number of dropout realizations. Further, the linguistic system uses a metric calculation module to determine pairwise edit distances between the multiple transcriptions that are produced during multiple dropout realizations. The metric calculation module further generates a distribution of pairwise edit distances between the multiple transcriptions. The metric calculation module then determines at least one feature or a parameter of the distribution, for example at least one of: a mean, a variance, or first four moments of the distribution. Various embodiments use the feature of distribution of pairwise distances between the multiple transcriptions for determining legitimacy of the input.

To that end, the linguistic system uses a classifier module that obtains the at least one feature and further determines legitimacy of the input based on the at least one feature. The output of the classifier module is a legitimacy decision stating whether the given input is legitimate or illegitimate. In some embodiments, the classifier module may be a neural network that outputs a classifying metric (probability of legitimacy) based on the at least one feature, where the classifying metric may be compared with a threshold value to classify the input. Based on the legitimacy decision of the classifier module, the linguistic system performs different actions.

To that end, in some implementations, the linguistic system includes a decision module that obtains the legitimacy decision of the classifier module. When the classifier module classifies the input as legitimate, the decision module generates and outputs the transcription of the audio input. For example, the decision module can output one of the previously determined transcription, and/or can execute the neural network without using dropout to provide legitimate transcription. Additionally, or alternatively, in one implementation, the multiple transcriptions include a transcription made without dropouts and the decision module outputs that transcription when the audio input is classified as legitimate. When the classifier module classifies the input as illegitimate, the decision module executes a counter measure routine that notifies a user of the linguistic system about illegitimacy of the input.

Accordingly, one embodiment discloses a linguistic system for transcribing an input, the linguistic system comprising: an input interface configured to accept the input; a memory configured to store a neural network trained to transcribe the input to produce a transcription. The linguistic system further comprising a processor configured to: execute the neural network multiple times while varying weights of at least some nodes of the neural network to produce multiple transcriptions of the audio input; determine a distribution of pairwise distances of the multiple transcriptions; determine at least one feature of the distribution of pairwise distances of the multiple transcriptions; submit the at least one feature of the distribution to a classifier to classify the audio input as a legitimate audio input or an illegitimate audio input. The linguistic system further comprising an output interface configured to: output a transcription of the audio input, when the audio input is classified as legitimate; and otherwise execute a counter-measure routine, when the input is classified as the illegitimate input.

In an example embodiment, the processor is further configured to vary weights of the at least some nodes of the neural networks by setting the weights of the at least some nodes of the neural network to zero. Further, in an example embodiment, the at least one feature comprises one of: a mean of the distribution, a variance of the distribution, or first four moments of the distribution.

In an example embodiment, the distribution of the pairwise distances comprise a distribution of distances between a medoid transcription and the multiple transcriptions, wherein the medoid transcription is a transcription with the smallest average distance to all other transcriptions of the multiple transcriptions. Further, the distances are edit distances between the medoid transcription and the multiple transcriptions.

In an example embodiment, the linguistic system produces each transcription subject to one or more language models. The language model can be used directly or indirectly with a transcribing neural network to produce accurate transcription of the input. The input to the linguistic system comprises at least one of an audio signal, a video signal, or an image signal.

In an example embodiment, to classify the input, the classifier is configured to determine a probability of legitimacy based on the at least one feature of distribution, wherein the classifier is further configured to compare the probability of the legitimacy with a predetermined threshold. The classifier may be a neural network that may automatically learn the threshold based on the training data. The threshold may be learned or tuned on held-out validation data. In another embodiment, the classifier may classify the input without any threshold.

In an example embodiment, the processor is configured to determine the mean of the distribution of pairwise distances, wherein to determine the legitimacy of the audio input, the processor is further configured to compare the mean with a mean threshold value. The linguistic system determines the audio input as legitimate when the mean of the distribution of pairwise edit distances is less than the mean threshold value. The linguistic system determines the audio input as illegitimate when the mean of the distribution of pairwise edit distances is greater than the mean threshold value.

In an example embodiment, when the processor executes the counter measure routine, the counter measure routine notifies a user of the linguistic system about illegitimacy of the input. Further, in another embodiment, the input includes a speech utterance.

In an example embodiment, the multiple transcription includes a no-dropouts transcription performed without dropouts by transcribing the input using stored weights of the nodes of the neural network, and wherein the output interface outputs the no-dropouts transcription when the input is legitimate.

In an example embodiment, upon classifying the input as legitimate, is configured to transcribe the input using stored weights of the nodes of the neural network to produce a no-dropouts transcription performed without dropouts, and wherein the output interface outputs the no-dropouts transcription.

In an example embodiment, an automatic speech recognition system may include the proposed linguistic system. Further, in an example embodiment, a control system may be configured to control a machine based on the transcription outputted by the proposed linguistic system.

Another embodiment discloses a method for transcribing an input, where the method uses a processor coupled with stored neural network and stored instructions implementing the method, wherein the instructions, when executed by the processor carry out steps of the method, comprising: executing the neural network multiple times while varying weights of at least some nodes of the neural network to produce multiple transcriptions of the audio input. The method further comprising: determining a distribution of pairwise distances of the multiple transcriptions; determining at least one feature of the distribution of pairwise distances of the multiple transcriptions; submitting the at least one feature of the distribution to a classifier to classify the input as a legitimate input or an illegitimate input, where the method further comprises: outputting a transcription of the input when the input is classified as legitimate; and otherwise executing a counter-measure routine, when the input is classified as the illegitimate input.

In an example embodiment, the method may comprise an input that includes a speech utterance. Further, in another embodiment, the method further comprises varying weights of the at least some nodes of the neural networks by setting the weights of the at least some nodes of the neural network to zero.

Another embodiment discloses a non-transitory computer readable storage medium embodied thereon a program executable by a processor for performing a method for transcribing an audio input, the method comprising: executing the neural network multiple times while varying weights of at least some nodes of the neural network to produce multiple transcriptions of the input; determining a distribution of pairwise distances of the multiple transcriptions; determining at least one feature of the distribution of pairwise distances of the multiple transcriptions; submitting the at least one metric to a classifier to classify the input as a legitimate input or an illegitimate input; outputting a transcription of the input, when the input is classified as legitimate; and otherwise executing a counter-measure routine, when the input is classified as the illegitimate input

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

Figure 1A:
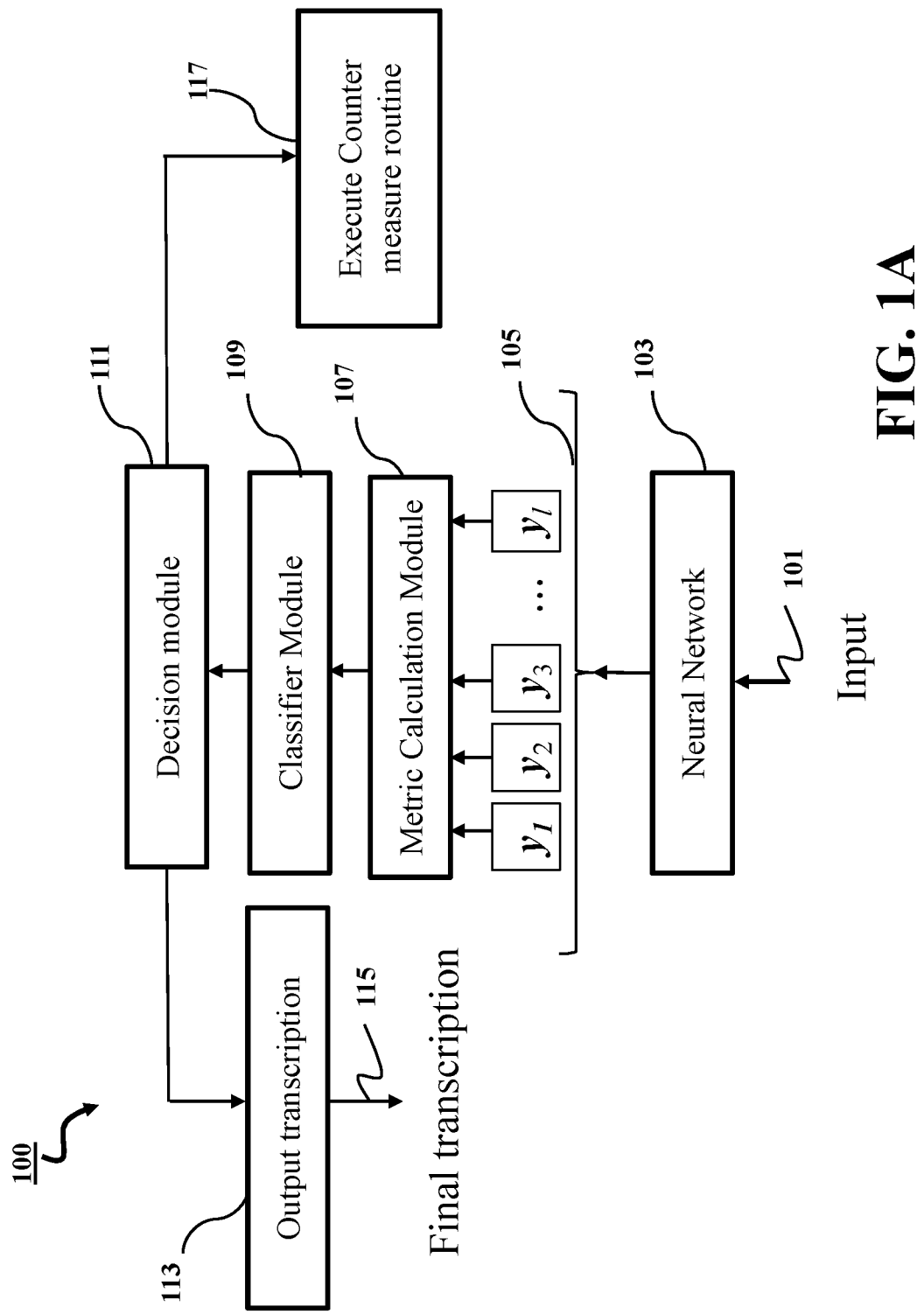
FIG. 1A illustrates a schematic of an exemplary linguistic system for transcribing an input according to some embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Some embodiments are based on the realization that an input to a linguistic system can be perturbed by adversaries. The input may be an image signal, a video signal, or an audio signal. This adversarial input can be used to manipulate the linguistic system to generate malicious or illegitimate transcriptions. The adversarial input comprises small imperceptible perturbations added to an original input waveform (or legitimate input). These perturbations when added to the legitimate input cause the linguistic system to transcribe the perturbed input or illegitimate input as any phrase that is chosen by adversaries. Some adversarial attacks in an audio domain are discussed below.

Different Types of Adversarial Attacks

1. Carlini and Wagner (CW) Attack

In CW attack an audio waveform $x'=x+\delta$ is constructed such that x and x' sound nearly the same but are transcribed differently by an automatic speech recognition (ASR) engine. The perturbation $\delta$ is optimized such that the perturbed waveform is transcribed as a specific alternate (typically malicious) target sentence t with the least distortion. More precisely, the CW attack minimizes a recognition loss function l(x+δ, t) for the perturbed input x+δ and the alternate target label sequence t, under the constraint that the peak energy of the perturbation be at least τ dB smaller than that of the original waveform:

$$\min_{\delta} l(x+\delta, t) \text{ s.t. } dB(\delta) \leq dB(x) - \tau, \quad (1)$$

where $dB(x) = 20 \max_i \log(|x_i|)$.

2. Noise Reduction Robust Attack

A noise reduction robust attack attempts to cause the ASR engine with and without a pre-processing denoising stage to transcribe the audio input as the target sentence t by back propagating through a denoising algorithm. For example, a spectral subtraction speech denoising algorithm can produce a noise reduction robust attack. The noise reduction robust attack can be formulated as:

$$\min_{\delta} c_1 l(x+\delta, t) + c_2 l_{ss}(x+\delta, t) \quad (2)$$
$$\text{s.t. } dB(\delta) \leq dB(x) - \tau,$$

where l is the recognition loss function used in the original CW attack without a pre-processing denoising stage, and $l_{ss}(x+\delta, t)$ is a loss function measuring the recognition error for the network processing the perturbed input after spectral subtraction denoising, under the assumption that the correct transcription should be t.

3. Imperceptible Audio Attack

The imperceptible audio attack on ASR systems is based on frequency masking. Frequency masking is the phenomenon whereby a softer sound (the maskee) is rendered inaudible by a louder sound (the masker). This attack is similar to the CW attack with just one more constraint that the power spectral density $p_\delta$ of the perturbation in the short-time Fourier transform (STFT) domain must fall below the masking threshold $\theta_x$ of the original audio sample. The imperceptible audio attack can be formulated as:

$$\min_{\delta} l(x+\delta, t) + \alpha \sum_{k=0}^{[\frac{N}{2}]} \max\{p_\delta(k) - \theta_x(k), 0\} \quad (3)$$

where l is the recognition loss function, α controls the relative importance of the term making the perturbation imperceptible, and N is the STFT window size. The attack can be divided into two stages: Stage 1 is the vanilla CW attack in which α is set to zero to ensure that the perturbed sample transcribes as t. In stage 2, α is set to slowly increasing non-zero values to gradually satisfy the imperceptibility constraint by fine-tuning the perturbation from stage 1.

4. Universal Perturbation Attack

A universal perturbation is a single perturbation which when added to various different input audio samples attempts to cause a mistranscription by the ASR engine. The universal perturbation is not a targeted attack, i.e., the transcription produced may not be fixed to particularly intended transcription. Moreover, it may transcribe to a meaningless sentence.

5. Urban Sound Attack

The urban sound attack can be constructed by applying vanilla CW attack to audio recordings of every day noises such as construction sounds, cars honking, leaves rustling, or the likes.

The linguistic systems are vulnerable to these and other similar adversarial attacks. Therefore, there is a need to implement a defense mechanism against these adversarial attacks in the linguistic system and make the linguistic system more robust to the adversarial attacks.

In an image domain, neural networks for transcribing input images use dropout as a defense mechanism against adversarial attacks on the input images. The dropout mechanism as explained earlier is a regularization technique that is typically used at training time to make neural networks robust to slight variations in the inputs. The dropout mechanism enables the neural network to learn various internal representations for the same input and output pair. Adversaries typically exploit loopholes within the neural network by crafting an input perturbation such that small finely-tuned differences accumulate within the neural network to eventually result in a malicious output. Since these adversarial attacks are often created based on knowledge of the underlying architecture of the model, such attacks may be disarmed by perturbing that architecture via a random process like dropout mechanism.

Using dropout mechanism in the image domain for classification of images produces intermediate representations and outputs with potentially lots of variations. However, in the image domain sizes of intermediate representations and outputs, usually in the form of vectors or multi dimensional arrays, remain the same. These intermediate representations and outputs can also typically be represented as points in a vector space. This enables easier comparison of the intermediate representations or outputs when using dropout mechanism at inference time as a defense mechanism. In particular, it is possible to directly compute features pertaining to the distribution of these intermediate representations or outputs. Commonly used such features include the mean and the variance of these intermediate representations or outputs.

Some embodiments are based on the realization that the dropout mechanism can be used in the audio domain to classify audio inputs. However, using dropout mechanism as a defense against adversarial audio attacks is difficult. This is because when multiple realizations of a neural network with various realizations of dropout are used to transcribe an audio input, they may produce transcriptions of different sizes (lengths). As explained earlier this is because even small variations in weights of the transcribing neural network can produce significant variations in resulting transcriptions. Hence, in the audio domain it is difficult to classify the audio input using the dropout mechanism. It is not straightforward to compute features pertaining to the distribution of such outputs, as these outputs cannot easily be represented as points in a unique vector space.

To address this issue, some embodiments are based on the realization that a neural network based linguistic system is stable to the dropout mechanism when there is a stable relationship between multiple outputs of the legitimate audio input processed with the dropout mechanism, which is different from relationships between multiple outputs of the illegitimate input.

FIG. 1A illustrates a schematic of an exemplary linguistic system for transcribing an input according to some embodiments. The linguistic system 100 is implemented using the dropout mechanism. The linguistic system 100 includes a neural network 103 that is configured to obtain an input 101 and further configured to transcribe the input. As used herein, the transcription of an input is representation of the input in a text form. The text form can be stored or represented in various digital formats. For example, in one embodiments, the input to the neural network is an audio input such as speech signal or voice command. In an example embodiment, the neural network 103 can be implemented as an automatic speech recognition (ASR) module that provides transcription to an audio input that can be just outputted or used to control a machine. Further, the input to the neural network 103 may be an image signal. In an example embodiment, the neural network 103 can be implemented as an image transcribing module that analyses contents of an input image and provides appropriate descriptions of the input image, such as a caption.

The linguistic system 100 further includes a processor in communication with a metric calculation module 107, a classifier module 109, and a decision module 111. Some or each of these modules is implemented using neural networks. On reception of the input 101 at an input interface of the linguistic system 100, the neural network 103 is executed multiple times to produce multiple transcriptions $y_1$, $y_2, \ldots, y_l$ 105 for the input 101. The number of times the neural network 103 is executed depends upon number of dropout realizations predefined for the linguistic system 100. During every execution of the neural network, weights of at least some nodes of the neural network 103 is varied to produce multiple transcriptions $y_1, y_2, \ldots, y_l$ 105. In some implementations, to simplify the computation, varying the weights of the at least some nodes includes setting the weights to zero.

In an example embodiment, when the input 101 is an audio signal with speech utterance "Hello World" is received by the linguistic system 100, where the linguistic system 100 is implemented with dropout realization value 50, then the neural network 103 is executed 50 times. The neural network generates 50 transcriptions $y_1, y_2, \ldots, y_{50}$ for the entire string "Hello World," where each transcription yi of a set of transcription $\{y_i\}_{i=1 \; to \; 50}$ is a potentially different transcription corresponding to the input audio "Hello World". (for example, $y_1$=Hallo Word, $y_2$=Hi Warld, $y_3$=Hallo Word, $y_4$=Hello World, etc.). Further, the neural network 103 using the dropout mechanism may generate transcriptions of different lengths for each realization of the dropout. This is especially the case when the linguistic system provides transcription using language models that influence the output. Therefore, it is difficult to directly obtain a feature of the distribution of the transcriptions themselves, as it is difficult to represent them in a unique vector space. It is thus difficult to obtain a parameter that can be used to determine uncertainty of the audio input (i.e., to determine whether the audio input is adversarial or not) in a similar way to what is done in the case of image classification.

To address this issue, the present disclosure proposes a linguistic system 100 that uses features obtained from distributions of a (non-Euclidean) distance metric as parameters to determine legitimacy of the audio input. The distance metric is an edit distance between character sequences with potentially different lengths. The linguistic system 100 uses the metric calculation module 107 that obtains the multiple transcriptions 105 and determines pairwise edit distances between multiple transcriptions 105. In some implementations, instead of considering all pairwise distances, the metric calculation module 107 determines a medoid transcription used as a reference transcription, and considers the distribution of the set of pairwise distances between the medoid and all other transcriptions. The medoid transcription is a transcription with the smallest average distance to all other transcriptions in the multiple transcriptions, where the distance is edit distance.

The edit distance is the minimum number of character insertions, deletions, and replacements required to convert a character sequence to another. For example, the edit distance between a first string "lord" and a second string "lamps" is 4 because a minimal edit script that transforms the first string into the second string is:
lord→lard (replace "o" with "a")
lard→lamd (replace "r" with "m")
lamd→lamp (replace "d" with "p")
lamp→lamps (insert "s" at the end)
Similarly edit distance between two strings "kitten" and "sitting" is 3. In an example embodiment, the linguistic system 100 is configured to use at least one of longest common subsequence (LCS) distance, Hamming distance, or Jaro-Winkler distance. The LCS distance is an edit distance with insertion and deletion as the only two edit operations, both at unit cost. Similarly, by only allowing substitutions (again at unit cost), Hamming distance is obtained; this must be restricted to equal-length strings. Jaro-Winkler distance can be obtained from an edit distance where only transpositions are allowed. In a preferred embodiment Levenshtein edit distance is used to determine pairwise edit distance between multiple transcriptions resulted from multiple dropout realizations.

The metric calculation module 107 further generates a distribution of pairwise distances of the multiple transcriptions 105. The distribution of the pairwise distances comprises a distribution of distances between the medoid transcription and the multiple transcriptions. The metric calculation module 107 then determines at least one feature of the distribution. Examples of the features include a mean of the distribution and/or a variance of the distribution. For example, some embodiments use first four moments of the distribution as the feature of the distribution to increase the accuracy of computations.

Further, the at least one feature is submitted to the classifier module 109 that classifies the input as the legitimate input or the illegitimate input. The classifier module uses the at least one feature of the distribution to determine whether the input is legitimate or not. Based on the requirements of the application, accuracy of the classifier module 109 to classify the audio inputs as legitimate or illegitimate can be increased using different features of the distribution. For example, using the first four moments may provide more accuracy in detecting adversarial input compared to other features of the distribution.

The output of the classifier module 109 which is legitimacy decision is provided to the decision module 111. Based on the legitimacy decision different actions are taken by the decision module 111. When the classifier module 109 classifies the audio input as the legitimate input, the linguistic system outputs a transcription of the input. Otherwise, when the input is classified as the illegitimate input, the linguistic system executes a counter-measure routine.

When the input is classified as legitimate, a previously determined transcription can be outputted as the final transcription or the neural network 103 can be executed again to produce the final transcription. For example, in one embodiment, the multiple transcriptions determined by neural network 103 include a no-dropouts transcription performed without dropouts by transcribing the input using stored weights of the nodes of the neural network. In this embodiment, the linguistic system outputs the no-dropouts transcription when the input is legitimate. An alternative embodiment, upon classifying the input as legitimate, is configured to transcribe the input using stored weights of the nodes of the neural network to produce a no-dropouts transcription performed without dropouts, and outputs the no-dropouts transcription. In another embodiment, upon classifying the input as legitimate, the linguistic system outputs the medoid transcription obtained from the multiple transcriptions determined by neural network 103.

On the other hand, when the classifier module 109 classifies the input as illegitimate, the decision module 111 executes a counter measure routine 117. The counter measure routine 117 is executed in order to provide indications to a user using the linguistic system 100 that the input 101 is illegitimate. In some embodiment, the counter measure routine 117 may provide a notification of the illegitimacy of the input 101 on a display device to the user. In another embodiment, the counter measure routine 117 may generate an alarm to notify the user about illegitimacy of the input 101.

Figure 1B:
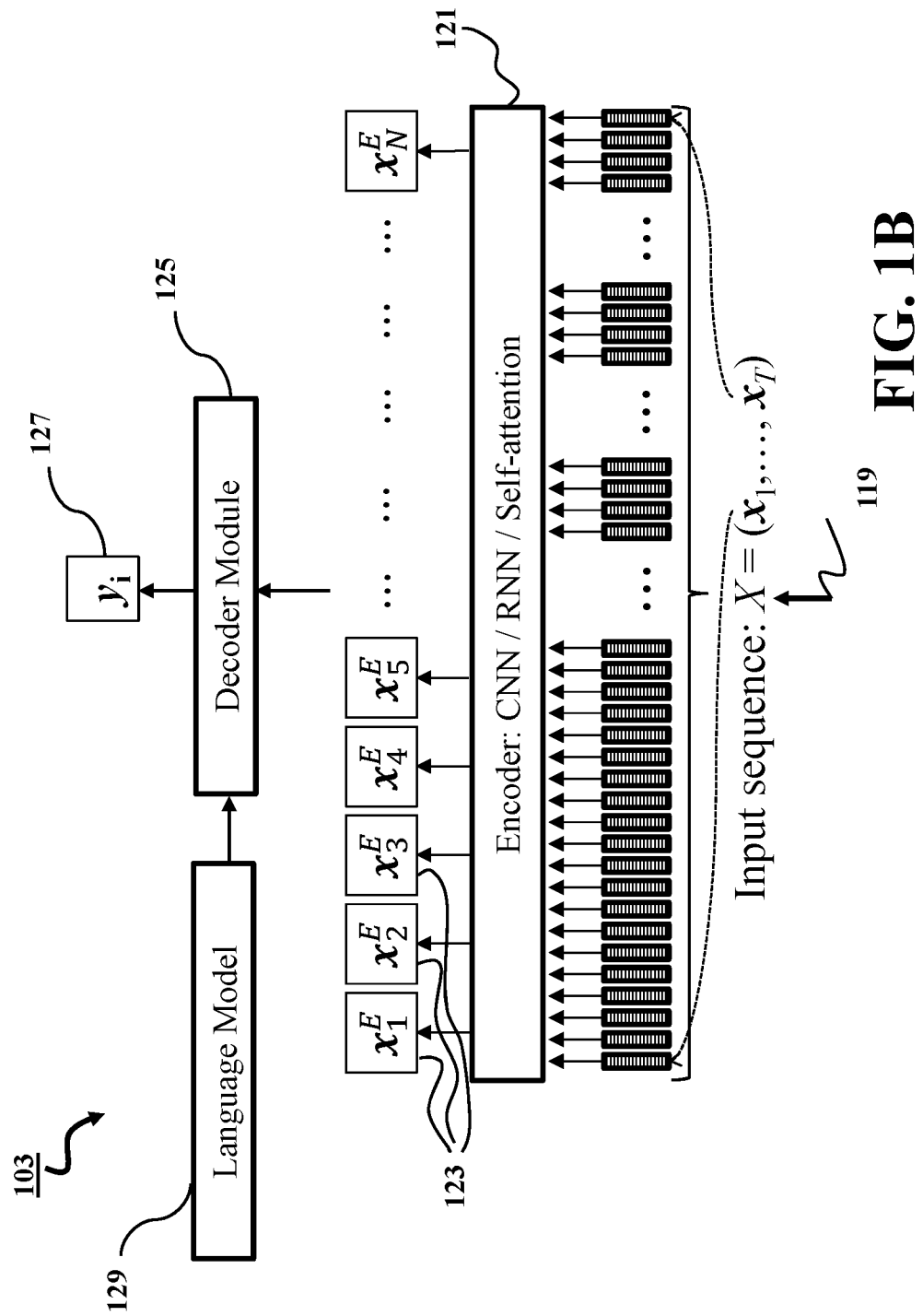
FIG. 1B illustrates an exemplary schematic of transcribing neural network according to an example embodiment.

Further, FIG. 1B illustrates an exemplary schematic of transcribing neural network according to an example embodiment. The exemplary neural network 103 is implemented as an automatic speech recognition (ASR) system that is used for transcribing an input audio signal. The exemplary transcribing neural 103 is based on encoder-decoder architecture. It comprises an encoder module 121, a decoder module 123, and a language model 129. Some or each of these modules is implemented using neural networks. The encoder module 121 obtains incoming stream of acoustic frames (or audio input) representing features of a speech utterance and processes the stream of acoustic frames to generate transcription output sequences. Each transcription output sequence is a transcription of the utterance or a portion of utterance represented by the corresponding audio input. For example, the ASR system can obtain incoming stream of acoustic frames 119 and generate corresponding transcription outputs 123 that are a transcription of the utterance represented by the incoming stream of acoustic frames 119.

The incoming stream of acoustic feature frames 119 may include a sequence of audio samples that is a digital representation of an utterance, e.g., a continuous stream of data. Each feature frame extracted from audio data may correspond to a sequence of time steps, e.g., where each frame of audio data is associated with 25 milliseconds of audio samples shifted 10 milliseconds further in time from the previous frame of audio data. Each frame of audio data in the sequence of feature frames of audio data may include acoustic information that characterizes the portion of the utterance at the corresponding time step. For example, the sequence of feature frames of audio data may include filter bank spectral energy vectors.

The transcriptions or label outputs 127 may include a sequence of transcription pieces of the utterance represented by the incoming stream of acoustic frames 119. The transcription outputs 127 may include one or more characters. For example, the transcription outputs 127 may be a character or a sequence of characters from a Unicode character set. For example, the character set may include the alphabet of English, Asian, Cyrillic as well as Arabic languages. The character set may also include Arabic numerals, a space character, and punctuation marks. Additionally or alternatively, transcription outputs can include byte encodings, words, and other linguistic constructions.

The ASR system includes the encoder module 121 that processes the incoming stream of acoustic feature frames 119 and generates a sequence of encoder states $x_1^E$ to $x_N^E$ 123 providing alternative, e.g., higher, representations for the input acoustic signal 119. The sequence of encoder states 123 may include an alternative sequence of feature frames of audio data that correspond to a second set of time steps. In some implementations, the alternative representation for the input acoustic sequence is subsampled to a lower frame rate, i.e., the second set of time steps in the alternative representation is smaller than the first set of time steps in the input acoustic sequence 119.

Further, the decoder module 125 is configured, e.g., trained, to process encoder states 123 successively and generate a transcription 127 associated with audio signal 119. In some embodiments, the decoder module 125 may be implemented as a frame synchronous decoder (FSD) module such as connectionist temporal classification (CTC). The FSD module is configured to successively process each encoder state of encoded features to identify an encoder state that updates a list of FSD prefixes maintained by the FSD module. In such a manner, the FSD module expands a current list of FSD prefixes in response to identifying a encoder state carrying information about a new transcription output to produce a list of FSD prefixes. Each FSD prefix is a candidate estimation by the FSD module of decoded transcription outputs with probability defined by its corresponding FSD score, i.e., the FSD score defines a probability of an FSD prefix being the decoded transcription outputs. The list of FSD prefixes and the list of FSD scores are updated upon decoding of subsequent encoder states. For example, a current list of FSD prefixes determined during a previous iteration is expanded to a new list of prefixes for a current iteration. The FSD module then outputs the prefixes with highest probability as transcriptions corresponding to the audio input. In some embodiments, the FSD module can use the language model 129 to update and pre-prune the list of generated FSD prefixes.

In other embodiments, the decoder module may be implemented as a label synchronous decoder (LSD) such as attention based decoder. The LSD module is configured, e.g., trained, to process a selected portion of the sequence of encoder states to update a list of LSD prefixes maintained by the LSD module. In some embodiments, the LSD module can use the language model 129 to update and pre-prune the list of generated LSD prefixes. In another embodiment, the decoder module may be implemented as a joint CTC-attention based decoder.

In the proposed disclosure, the neural network 103 may be implemented as the ASR system as described above. In this case, the neural network 103 may be configured to receive audio signal as an input. The proposed linguistic system 100 that uses dropout mechanism, executes the ASR system multiple times to produce multiple transcriptions for the audio input. The linguistic system 100 further determines distribution of edit distances between these multiple transcriptions, and further determines at least one feature of the distribution by using the metric calculation module 107. The at least one feature of the distribution is used by the classifier module 109 to determine legitimacy of the audio input signal.

Figure 1C:
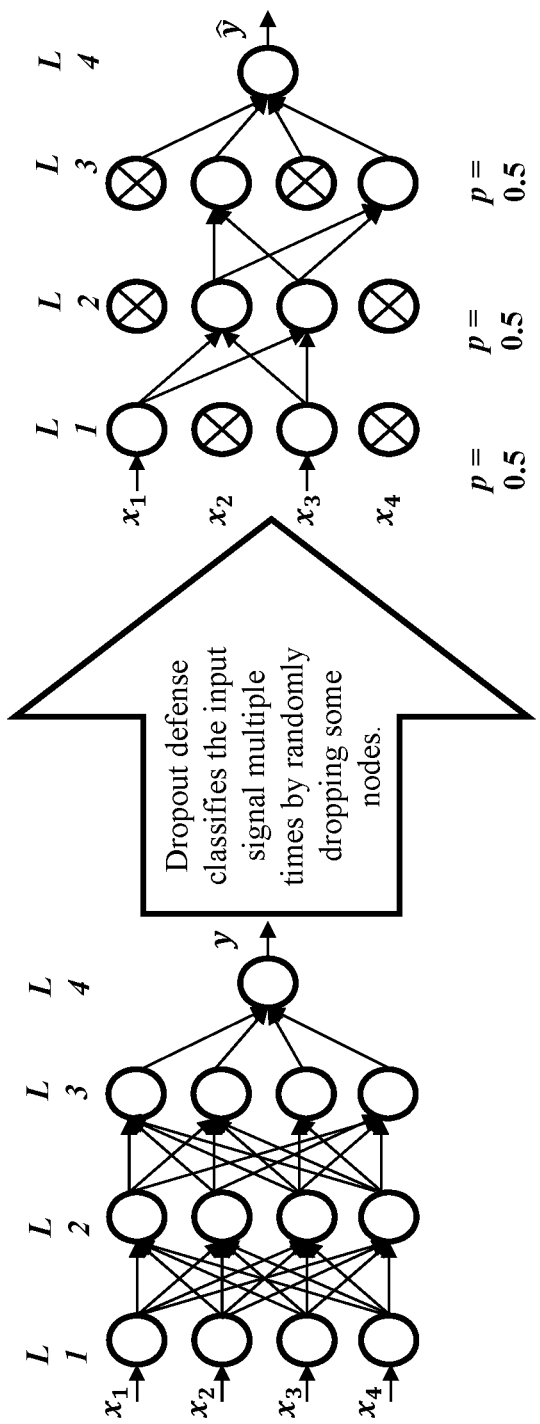
FIG. 1C illustrates an exemplary neural network using dropout mechanism according to some embodiments.

FIG. 1C illustrates an exemplary neural network using dropout mechanism according to some embodiments. The exemplary neural network comprises four layers L1, L2, L3, and L4. Each layer is made up of four nodes/neurons. The layer L1 forms the input layer of the neural network. The layers L2 and L3 form hidden layers of the neural network, and the layer L4 forms the output layer of the neural network. The input layer L1 obtains a 4-dimension input signal $[x_1, x_2, x_3, x_4]$. Further, the output layer L4 provides the output ŷ. The term "dropout" refers to dropping out units/nodes (hidden and visible) in a neural network. By dropping a node out, the node is removed from the network, along with all its incoming and outgoing edges. The choice of which nodes to drop is random. In the simplest case, each node is dropped with a fixed probability p, where p can be chosen based on the particular problem by a validation set (the value used here as example is p=0.5). Dropping out is done independently for each node and for each training case. Thus, applying dropout to a neural network amounts to sub-sampling a "thinned" neural network from it. A neural network with n units can be seen as a collection of $2^n$ possible thinned neural networks. These networks all share weights so that the total number of parameters is still $O(n^2)$, or less. As can be observed in the FIG. 1B during dropout, nodes in each layer are dropped with probability p=0.5. Therefore, dropout rate of the dropout mechanism used in the exemplary neural network is 0.5. Further, dropout mechanism comprises multiple dropout realizations. The multiple dropout realizations may be predefined for a particular neural network.

For large n, each time a training case is presented, it is likely to use a new thinned network. So training a neural network with dropout can be seen as training a collection of $2^n$ thinned networks with massive weight sharing, where each thinned network gets trained very rarely, if at all.

When the model is being used at test time, it is not feasible to explicitly average the predictions from exponentially many thinned models. However, a very simple approximate averaging method is used. The idea is to use a single neural network at test time without dropout. The weights of this test network are scaled versions of the weights of the thinned networks used during training. The weights are scaled such that for any given input to a hidden unit the expected output ŷ (under the distribution used to drop units at training time) is the same as the output at test time. So, if a unit is dropped with probability p, this amounts to multiplying the outgoing weights of that unit by p. With this approximate averaging method, $2^n$ networks with shared weights can be combined into a single neural network to be used at test time. Training a network with dropout and using the approximate averaging method at test time leads to significantly lower generalization error on a wide variety of classification problems.

Optionally, the linguistic system 100 can also be trained using dropout mechanism that is explained above in order to detect adversarial input. Such a training helps to ensure that legitimate inputs are correctly transcribed most of the time even when using various dropout realizations. The linguistic system 100 is implemented using a neural network and includes one or more processors to execute the neural network. On receiving the input, the one or more processors execute the neural network multiple times and transcribe the input multiple times. Number of times the input signal is decoded depends on number of dropout realizations I required to determine uncertainty of the input. The number of dropout realizations I can be predefined. In each realization, weights of at least some nodes of the neural network are varied to produce multiple transcriptions of the input. The weights of the at least some nodes are reduced to zero in each realization, so that at least one node is completely deactivated in the corresponding dropout realization.

Further, each realization i of the I dropout realizations results in a new set of network parameters $W^{(i)}$, i=1 ..., I. Let the output of the network for realization i with network parameters $W^{(i)}$ be:

$$y_i = y(x, W^{(i)}) \quad (4)$$

Initially, the linguistic system 100 executes the neural network 103 multiple times and generates a set of multiple transcriptions $\{y_i\}_{i=1}^{I}$ corresponding to the I dropout realizations. The linguistic system then determines a medoid transcription ŷ of the set $\{y_i\}_{i=1}^{I}$. The medoid transcription ŷ is defined as an element of the set $\{y_i\}_{i=1}^{I}$ whose average distance to all other elements in the set $\{y_i\}_{i=1}^{I}$ is the smallest. The medoid transcription ŷ is defined as follows:

$$\hat{y} = \operatorname*{argmin}_{y \in \{y_1, \ldots, y_I\}} \sum_{i=1}^{I} d(y, y_i) \quad (5)$$

where d is some distance metric.

The linguistic system 100 is further configured to determine edit distances between each transcription $y_i$ and the medoid ŷ. Further, based on these edit distances the linguistic system 100 is further configured to determine a distribution of pairwise distances of the multiple transcriptions. This distribution is an empirical distribution of edit distances between each transcription and the medoid transcription, i.e.

$$P_x(c) = \frac{1}{I} \sum_{i=1}^{I} 1_{\{d(\hat{y}, y_i) = c\}}, c \in N \quad (6)$$

where d (ŷ, $y_i$) is the edit distance (pairwise distance) between each transcription of the set $\{y_i\}_{i=1}^{I}$ and the medoid transcription. $P_x$ is an empirical distribution of edit distances between each transcription $y_i$ and the medoid transcription ŷ. Therefore, $P_x$ represents a probabilistic correlation between dropouts and the distribution of pairwise edit distances of outputs of transcribing neural network (i.e. the ASR module). The linguistic system 100 uses this correlation to determine legitimacy of the audio input i.e. to determine whether the input is adversarial or not.

To that end, the linguistic system 100 uses the classifier module 109. The classifier module 109 is a neural network that obtains at least one feature of the empirical distribution of edit distances between each transcription $y_i$ and the medoid transcription ŷ. The at least one feature of the distribution may comprise one or more moments of the distribution, such as a first moment (i.e. mean) of the distribution, a second moment (i.e. variance) of the distribution, or first four moments of the distribution. In some embodiments, the classifier module 109 may determine a probability of legitimacy based on the obtained at least one feature of the distribution. In an example embodiment, the classifier module 109 uses a support vector machine (SVM) classifier to determine the probability of legitimacy of the input. The classifier module 109 may further compare the probability of the legitimacy to a predetermined threshold in order to determine whether the audio input is legitimate or not. The classifier module 109 may classify the audio input as legitimate when the probability of the legitimacy is greater than the threshold. Further, it may classify the audio input as illegitimate when the probability of legitimacy is less than the threshold.

In another embodiment, the classifier module 109 may comprise configurable threshold. In this case, the threshold can be tuned based on at least one of type of feature received for calculating legitimacy, type of the input signal (i.e. either audio or image), type of application, or the likes. In another embodiment, the classifier module 109 may be implemented using neural networks, where the classifier module 109 determines the threshold automatically based on ground truth data. In an example embodiment, the classifier module 109 may be trained directly with the ground truth data which may enable the classifier module to determine legitimacy of the input without using the threshold.

On determining that the input is legitimate, the linguistic system 100 provides legitimate transcription 115 associated with the input. On the other hand, on determining that the input is illegitimate the linguistic system 100 indicates that the input is determined illegitimate. Further, a detailed description of different modules of the linguistic system 100 is provided below.

The Encoder Module

The encoder module 103 includes an encoder network used to convert acoustic feature sequence $X = x_1, \ldots, x_T$ associated with the audio input into embedding vector sequence $X_E = x_1^E, \ldots, x_1^E$ as $$X_E = \text{Encoder}(X), \quad (7)$$

where function Encoder(X) may include one or more recurrent neural networks (RNNs), convolutional neural networks (CNN), feed-forward neural networks, or self-attention neural networks, which are stacked to a deep architecture. An RNN may be implemented as a Long Short-Term Memory (LSTM), which has an input gate, a forget gate, an output gate, and a memory cell in each hidden unit. Another RNN may be a bidirectional RNN (BRNN) or a bidirectional LSTM (BLSTM). A BLSTM is a pair of LSTM RNNs, one is a forward LSTM and the other is a backward LSTM. An embedding vector of the BLSTM is obtained as a concatenation of hidden vectors of the forward and backward LSTMs.

With the forward LSTM, the forward n-th hidden vector $h_t^F$ is computed as $$h_t^F = o_t^F \odot \tanh(c_t^F) \quad (8)$$

$$o_t^F = \sigma(W_{xo}^F x_t + W_{xc}^F h_{t-1}^F + b_o^F) \quad (9)$$

$$c_t^F = f_t^F \odot c_{t-1}^F + i_t^F \odot \tanh(W_{xc}^F x_t + W_{hc}^F h_{t-1}^F + b_c^F) \quad (10)$$

$$f_t^F = \sigma(W_{xf}^F x_t + W_{hg}^F h_{t-1}^F + b_f^F) \quad (11)$$

$$i_t^F = \sigma(W_{xi}^F x_t + W_{hi}^F h_{t-1}^F + b_i^F). \quad (12)$$

where $\sigma(\cdot)$ is the element-wise sigmoid function, $\tanh(\cdot)$ is the element-wise hyperbolic tangent function, and $i_t^F$, $f_t^F$, $o_t^F$ and $c_t^F$ are the input gate, forget gate, output gate, and cell activation vectors for $x_t$, respectively. $\odot$ denotes the element-wise multiplication between vectors. The weight matrices $W_{zz}^F$ and the bias vector $b_z^F$ are the parameters of the LSTM, which are identified by the subscript $z \in \{x, h, i, f, o, c\}$. For example, $W_{hi}^F$ is the hidden-to-input gate matrix and $W_{xo}^F$ is the input-to-output gate matrix. The hidden vector $h_t^F$ is obtained recursively from the input vector $x_t$ and the previous hidden vector $h_{t-1}^F$, where $h_0^F$ is assumed to be a zero vector.

With the backward LSTM, the backward t-th hidden vector $h_t^B$ is computed as $$h_t^B = o_t^B \odot \tanh(c_t^B) \quad (13)$$

$$o_t^B = \sigma(W_{xo}^B x_t + W_{xc}^B h_{t+1}^B + b_o^B) \quad (14)$$

$$c_t^B = f_t^B \odot c_{t+1}^B + i_t^B \odot \tanh(W_{xc}^B x_t + W_{hc}^B h_{t+1}^B + b_c^B) \quad (15)$$

$$f_t^B = \sigma(W_{xf}^B x_t + W_{hg}^B h_{t+1}^B + b_f^B) \quad (16)$$

$$i_t^B = \sigma(W_{xi}^B x_t + W_{hi}^B h_{t+1}^B + b_i^B) \quad (17)$$

where $i_t^B$, $f_t^B$, $o_t^B$ and $c_t^B$ are the input gate, forget gate, output gate, and cell activation vectors for $x_t$, respectively. The weight matrices $W_{zz}^B$ and the bias vector $b_z^B$ are the parameters of the LSTM, which are identified by the subscript in the same manner as the forward LSTM. The hidden vector $h_t^B$ is obtained recursively from the input vector $x_t$ and the succeeding hidden vector $h_{t+1}^B$, where $h_{T+1}^B$ is assumed to be a zero vector.

The hidden vector of the BLSTM is obtained by concatenating the forward and backward hidden vectors as $$h_t = [h_t^{F^T}, h_t^{B^T}]^T \quad (18)$$

where T denotes the transpose operation for the vectors assuming all the vectors are column vectors. $W_{zz}^F$, $b_z^F$, $W_{zz}^B$, and $b_z^B$ are considered the parameters of the BLSTM.

To obtain better hidden vectors, some implementations stack multiple BLSTMs by feeding the hidden vectors of the first BLSTM to the second BLSTM, then feeding the hidden vectors of the second BLSTM to the third BLSTM, and so on. If $h_t'$ is a hidden vector obtained by one BLSTM, $x_t = h_t'$ when feeding it to another BLSTM. To reduce the computation, some embodiments may feed only every second hidden vectors of one BLSTM to another BLSTM. In this case, the length of output hidden vector sequence becomes the half of the length of input acoustic feature sequence.

The Decoder Module

The decoder module may be implemented using at least one of CTC neural network, attention based neural network, or joint CTC-attention based neural network.

Connectionist Temporal Classification (CTC)

In one embodiment, the decoder module is implemented using CTC neural network as described above. The CTC module computes a CTC forward probability of label sequence Y given the embedding vector sequence $X_E$. Note that the CTC formulation uses L-length label sequence $Y = (y_1, \ldots, y_L)$ where $y_l \in \mathcal{U}$ and $\mathcal{U}$ is a set of distinct labels. By introducing the frame wise label sequence $Z = (z_1, \ldots, z_N)$ with $z_n \in \mathcal{U} \cup \{\epsilon\}$, where $\epsilon$ represents an additional blank label, and using the probabilistic chain rule and conditional independence assumption, the posterior distribution p(Y|X) is factorized as follows:

$$p(Y \mid X) \quad (19)$$
$$\approx \sum_Z p(Y \mid Z) p(Z \mid X) \approx \sum_Z p(Y \mid Z) \prod_n p(z_n \mid X)$$
$$\approx \sum_Z \prod_n p(z_n \mid z_{n-1}, Y) p(z_n \mid X),$$

where $p(z_n | z_{n-1}, Y)$ is considered a label transition probability including blank labels. $p(z_n | X)$ is the framewise posterior distribution conditioned on the input sequence X, and modeled by using an encoder neural network as described above followed by a linear transform and a softmax function:

$$p(z_n \mid X) = \text{softmax}(W_{hy}^{CTC} x_n^E + b_y^{CTC}), \quad (20)$$

where $x_n^E$ is obtained with an encoder network. $W_{hy}^{CTC}$ is a weight matrix and $b_y^{CTC}$ is a bias vector, which are trainable parameters of the CTC model. Although Eq. (19) has to deal with a summation over all possible Z, it can be efficiently computed by using the forward-backward algorithm and dynamic programming.

Attention-Based Decoder

In some embodiments, the decoder module is implemented using an attention-based neural network. The attention-based neural network includes a decoder network used to compute label sequence probability $p(Y|X)$ using embedding vector sequence $X_E$. Suppose Y is an L-length label sequence $y_1, y_2, \ldots, Y_L$. To compute $p(Y|X)$ efficiently, the probability can be factorized by a probabilistic chain rule as $$p(Y \mid X) = \prod_{l=1}^{L} p(y_l \mid y_1, \ldots, y_{l-1}, X), \quad (21)$$

and each label probability $p(y_l|y_1, \ldots, y_{l-1}, X)$ is obtained from a probability distribution over labels, which is estimated using the decoder network as $$p(y_l|y_1, \ldots, y_{l-1}, X) = \text{Decoder}(r_l, q_{l-1}), \quad (22)$$

where y is a set of integers representing each label output, $r_l$ is called a content vector, which has content information of $X_E$. $q_{l-1}$ is a decoder state vector, which contains contextual information of the previous labels $y_1, \ldots, y_{l-1}$ and the previous content vectors $r_0, \ldots, r_{l-1}$. Accordingly, the label probability is obtained as the probability of $y=y_l$ given the context, i.e.

$$p(y_l|y_1, \ldots, y_{l-1}, X) = p(y=y_l|y_1, \ldots, y_{l-1}, X) \quad (23)$$

The content vector $r_l$ is usually given as a weighted sum of embedding vectors of the encoder network, i.e.

$$r_l = \sum_n a_{ln} x_n^E, \quad (24)$$

where $a_{ln}$ is called an attention weight that satisfies $\Sigma_n a_{ln}=1$. The attention weights can be computed using $q_{l-1}$ and $X_E$ as $$e_{ln} = w^T \tanh(W q_{l-1} + V x_n^E + U f_{ln} + b) \quad (25)$$

$$f_l = F * a_{l-1} \quad (26)$$

$$a_{ln} = \frac{\exp(e_{ln})}{\sum_n \exp(e_{ln})} \quad (27)$$

where W, V, F and U are matrices, and w and b are vectors, which are trainable parameters of the decoder network. $e_{ln}$ is a matching score between the (l−1)-th state vector $q_{l-1}$ and the t-th hidden vector $x_n^E$ to form a temporal alignment distribution $a_l=\{a_{ln}|n=1, \ldots, N\}$. $a_{l-1}$ represents the previous alignment distribution $\{a_{(l-1)n}|n=1, \ldots, N\}$ used for predicting the previous label $y_{l-1}$. $f_l=\{f_{lt}|t=1, \ldots, N\}$ is the convolution result with F for $a_{l-1}$, which is used to reflect the previous alignment to the current alignment. "*" denotes a convolution operation.

The label probability distribution is obtained with state vector $q_{l-1}$ and content vector $r_l$ as $$\text{Decoder}(r_l, q_{l-1}) = \text{softmax}(W_{qy} q_{l-1} + W_{ry} r_l + b_y), \quad (28)$$

where $W_{qy}$ and $W_{ry}$ are matrices and $b_y$ is a vector, which are trainable parameters of the decoder network. The softmax( ) function is computed as $$\text{softmax}(v) = \left. \frac{\exp(v[i])}{\sum_{j=1}^{K} \exp(v[j])} \right|_{i=1,\ldots,K} \quad (29)$$

for a K-dimensional vector v, where v[i] indicates the i-th element of v.

After that, decoder state vector $q_{l-1}$ is updated to $q_l$ using an LSTM as $$q_l = o_l^D \odot \tanh(c_l^D) \quad (30)$$

$$o_l^D = \sigma(W_{ox}^D x_l^D + W_{xc}^D q_{l-1} + b_o^D) \quad (31)$$

$$c_l^D = f_l^D \odot c_{l-1}^D + i_l^D \odot \tanh(W_{xc}^D x_l^D + W_{hc}^D q_{l-1} + b_c^D) \quad (32)$$

$$f_l^D = \sigma(W_{xf}^D x_l^D + W_{hg}^D q_{l-1} + b_f^D) \quad (33)$$

$$i_l^D = \sigma(W_{xi}^D x_l^D + W_{hi}^D q_{l-1} + b_i^D). \quad (34)$$

where $i_l^D$, $f_l^D$, $o_l^D$ and $c_l^D$ are the input gate, forget gate, output gate, and cell activation vectors for input vector $x_l$, respectively. The weight matrices $W_{zz}^D$ and the bias vector $b_z^D$ are the parameters of the LSTM, which are identified by the subscript in the same manner as the forward LSTM. The state vector $q_l$ is obtained recursively from the input vector $x_l^D$ and the previous state vector $q_{l-1}$, where $q_0$ is computed assuming $q_{-1}=0$, $y_0=<sos>$, and $a_0=1/T$. For the decoder network, the input vector $x_l^D$ is given as a concatenated vector of label $y_l$ and content vector $r_l$, which can be obtained as $x_l^D = [\text{Embed}(y_l)^T, r_l^T]^T$, where Embed(•) denotes label embedding, that converts a label into a fixed dimensional vector.

In attention-based speech recognition, estimating appropriate attention weights is very important to predict correct labels, since content vector $r_l$ is deeply dependent on alignment distribution $a_l$ as shown in Eq. (28). In speech recognition, the content vector represents acoustic information in the encoder's hidden vectors around the peak of the alignment distribution, and the acoustic information is the most important clue to predict label $y_l$. Nevertheless, the attention mechanism often provides irregular alignment distributions because there is no explicit constraint so that the peak of the distribution proceeds monotonically along time when incrementally predicting $y_l$. In speech recognition, the alignment between input sequence and output sequence should be monotonic in general. Although the convolution feature $f_{lt}$ alleviates generating irregular alignments, it cannot guarantee to avoid them.

The Classifier Module

The classifier module 109 may be implemented using binary classifiers. The binary classifier may be at least one of a decision stump or a support vector machine (SVM). Binary classifier classifies the elements of a given set into two groups (predicting which group each one belongs to) on the basis of a classification rule. The binary classifier is trained a priori on a training dataset to classify a new input as adversarial or non-adversarial. In order to classify the input, the classifier module 109 obtains the at least one feature such as mean or the likes associated with the distribution, and determine the adversarial audio based on the one or more features. In some embodiments, the classifier module 109 is configured to obtain a complete histogram of the distribution truncated to some upper bound distance values instead of the at least one feature in order to determine the legitimacy decision.

Decision Stump (DS) Binary Classifier

A decision stump is a machine learning model consisting of a one-level decision tree. That is, it is a decision tree with one internal node (the root) which is immediately connected to the terminal nodes (its leaves). The decision stump makes a prediction based on the value of just a single input feature. Sometimes they are also called 1-rules.

In an embodiment, the DS binary classifier is trained on the mean of the distribution $P_x$ of pairwise edit distances during the training phase.

Support Vector Machine (SVM) Binary Classifier

The support-vector network or support-vector machine (SVM) implements the following idea: the SVM maps input vectors into some high dimensional feature space Z through some non-linear mapping chosen a priori. In this space a linear decision surface (i.e. a hyperplane) is constructed with special properties that ensure high generalization ability of the network. The hyperplane is defined as linear decision function with maximal margin between the vectors of the two classes. In order to construct the hyperplanes a small amount of the training data is taken into account. The training data is called support vectors, which determine this margin.

Let the training dataset for training the SVM classifier be of n points of the form $(x_1, y_1), \ldots, (x_n, y_n)$ where $y_i$ are are either 1 or −1, each indicating the class to which the point $x_i$ belongs. Each $x_i$ is a p-dimensional real vector. In some embodiments the SVM is trained on first four moments of the distribution $P_x$, such SVM is referred to as SVM-4 from here onwards. In some other embodiments, the SVM is trained on entire distribution $P_x$, where the range of distances is truncated to some fixed value in order to obtain vectors of fixed size, such SVM is referred to as SVM-F from here onwards.

In order to find "maximum-margin hyperplane" that divides the group of points $x_i$ for which $y_i=1$ from the group of points for which $y_i=-1$, which is defined so that the distance between the hyperplane and the nearest point $x_i$ from either group is maximized. The hyperplane can be written as the set of points x satisfying:

$$w^*x-b=0 \quad (35)$$

where w is the normal vector to the hyperplane. Further, a parameter $$\frac{b}{\|w\|}$$

determines the offset of the hyperplane from the origin along the normal vector w.

If the training data is linearly separable, two parallel hyperplanes can be selected. The two parallel hyperplanes separate two classes of data, so that the distance between them is as large as possible. The region bounded by these two hyperplanes is called the "margin", and the maximum-margin hyperplane is the hyperplane that lies halfway between them. With a normalized or standardized dataset, these hyperplanes can be described by the equations:

$w^*x-b=1$ (anything on or above this boundary is of one class, with label 1)

and $w^*x-b=-1$ (anything on or above this boundary is of one class, with label −1)

Geometrically, the distance between these two hyperplanes is $$\frac{2}{\|w\|},$$

so to maximize the distance between the planes, $\|w\|$ is minimized. Further, to prevent data points from falling into the margin, following constraints are used: for each i either $w^*x-b \geq 1$ if $y_i=1$ or $w^*x-b \leq 1$ if $y_i=-1$. These constraints state that each data point must lie on the correct side of the margin.

This can be rewritten as $$y_i(w^*x-b) \geq 1), \text{ for all } 1 \leq i \leq n \quad (36)$$

Therefore, by putting above minimization of $\|w\|$ together with equation (36), an optimization problem can be written as "Minimize $\|w\|$ subject to $y_i(w^*x-b) \geq 1$) for i=1, . . . , n." The w and b that solve the optimization problem stated above determine classifier $\text{sgn}(w^*x-b)$. Thus, the max-margin hyperplane is completely determined by those $x_i$ that lie nearest to the hyperplane.

Further, a detailed analysis of the dropout training used to train the linguistic system 100 is provided below.

Dropout Training

The linguistic system 100 is implemented using neural network. This neural network that uses dropout mechanism is referred to as a dropout neural network from hereon. As an example, a simple case of a fully-connected multi-layer neural network is considered, but dropout can be applied similarly to other types of neural networks. Let this dropout neural network be implemented with L hidden layers. Further, let $l \in \{1, \ldots, L\}$ index the hidden layers of the network. Let $z^{(l)}$ denote the vector of inputs into layer l, $y^{(l)}$ denote the vector of outputs from l ($y^{(0)}=x$ is the input). $W^{(l)}$ and $b^{(l)}$ are the weights and biases at layer l. The feed forward operation of the neural network can be described as (for $l \in \{0, \ldots, L-1\}$)

$$z^{(l+1)} = W^{(l+1)} y^l + b^{(l+1)} \quad (37)$$

$$y^{(l+1)} = f(z^{(l+1)}) \quad (38)$$

where $f$ is any activation function. With dropout, the feed forward operation becomes $$r_i^{(l)} \sim \text{Bernoulli}(p) \quad (39)$$

$$\tilde{y}^{(l)} = r^{(l)} * y^{(l)} \quad (40)$$

$$z^{(l+1)} = W^{(l+1)} \tilde{y}^{(l)} + b^{(l+1)} \quad (41)$$

$$y^{(l+1)} = f(z^{(l+1)}) \quad (42)$$

where, $r^{(l)}$ is a vector of Bernoulli random variables each of which has probability p of being 1. This vector is sampled for each layer and multiplied element-wise with the outputs of that layer, $y^l$, to create the thinned outputs $\tilde{y}^{(l)}$. The thinned outputs are then used as input to the next layer. For learning, the derivatives of the loss function are back propagated through the thinned network. At test time, the weights are scaled as $W_{test}^{(l)}=pW^{(l)}$. The resulting neural network is run without dropout.

The dropout neural network can be trained with stochastic gradient descent. Dropout is done separately for each training case in every minibatch and dropout can be used with any activation function. Further, the dropout neural network can be regularized by constraining the norm of the incoming weight vector at each hidden unit to be upper bounded by a fixed constant c. In other words, if $w_i$ represents the vector of weights incident on hidden unit i, the neural network can be optimized under the constraint $\|w_i\|_2 \leq c$. The constant c is a tuneable hyper parameter, which can be determined using a validation set. Although dropout alone gives significant improvements, optimizing under this constraint, coupled with a large decaying learning rates and high momentum provides a significant boost over just using dropout.

Figure 2:
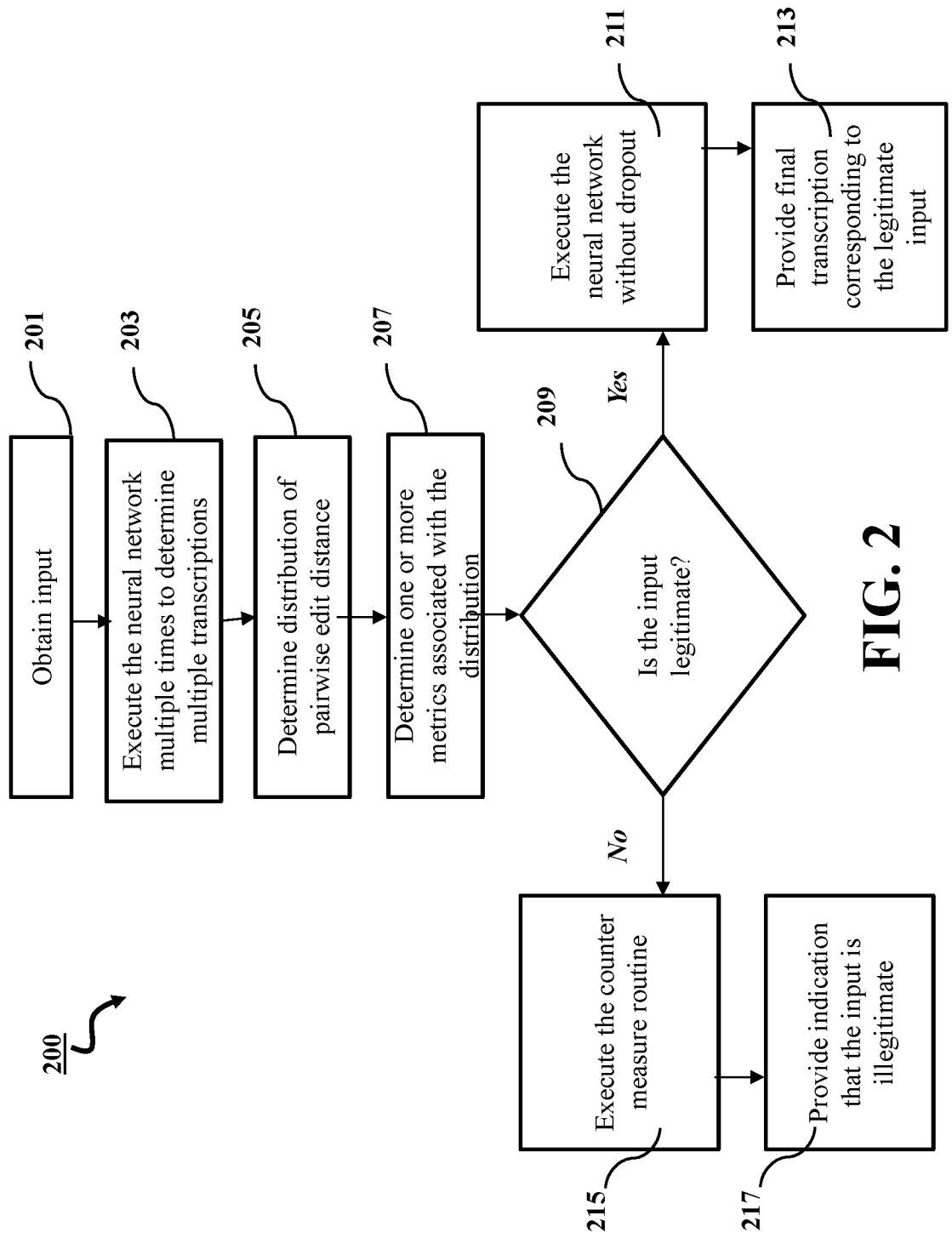
FIG. 2 illustrates steps of a method implemented for detecting adversarial attacks according to some embodiments.

FIG. 2 illustrates steps of a method implemented for detecting adversarial audio attacks, according to some embodiments. At least one linguistic system 100 and method 200, can begin with step 201 that includes obtaining input, from input interface of the linguistic system 100. The input may be obtained wirelessly through a communication channel. At step 203, executing the neural network 103 multiple times to determine multiple transcriptions. The number of times the neural network is executed is based on a predetermined number of dropout realizations. At step 205, determining a distribution of pairwise edit distances between multiple transcriptions. The set of pairwise edit distances considered in the distribution is the set of distances between each transcription of the multiple transcriptions and a medoid transcription of the multiple transcriptions. The distribution represents a probabilistic correlation between dropouts and distribution of pairwise edit distances of outputs of the neural network.

At step 207, determining, by the metric calculation module 107, at least one feature of the distribution. The at least one feature may comprise at least one of a mean, variance, or set of first four moments of the distribution. The at least one feature is used to determine legitimacy of the input. The metric calculation module 107 provides the determined at least one feature of the distribution to the classifier module 109. At step 209, determining by the classifier module 109 whether the input is legitimate or not. When the input is classified as legitimate, the method proceeds to step 211. At step 211, executing the neural network 103 without using the dropout mechanism. Thus, nodes of the neural network 103 use stored weights to generate a final transcription corresponding to the input that is classified as legitimate. At step 213, providing the final transcriptions corresponding to the legitimate input.

On the other hand, when the input is classified as illegitimate, the method proceeds to step 215. At step 215, executing the counter measure routine. The counter measure routine may be predetermined for the linguistic system 100. At step 217, based on the execution of the counter measure routine, providing indications that the input is illegitimate. The indication may comprise notification on a display device, generating alarm, flashing a screen of the display device, or the likes.

Exemplar Implementations

Figure 3:
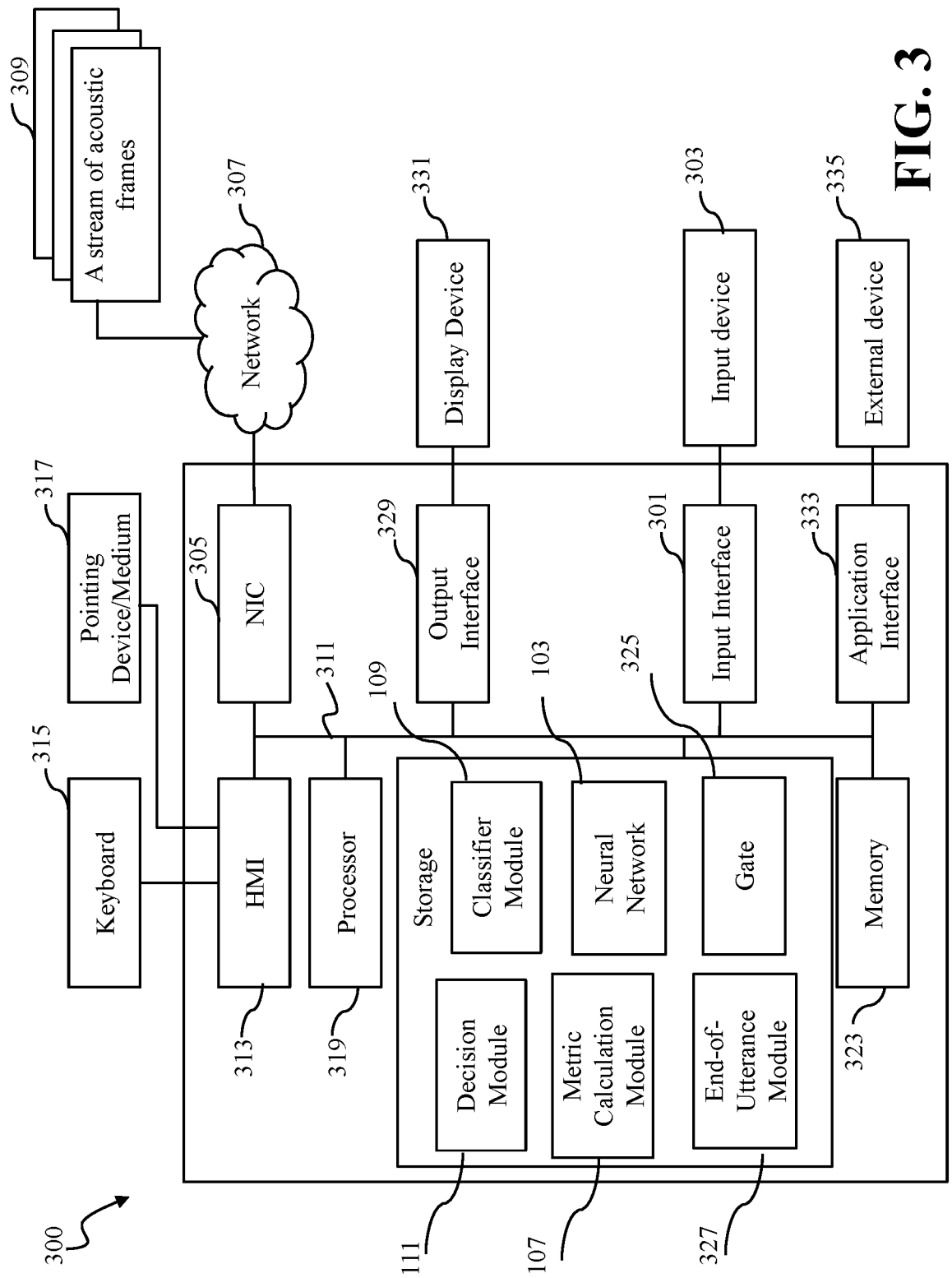
FIG. 3 illustrates a block diagram of some components that can be used in various configurations for implementing the linguistic system according to some embodiments.

FIG. 3 illustrates a block diagram of some components that can be used in various configurations for implementing the linguistic system, according to some embodiments. The computer-based linguistic system 300 includes a number of interfaces connecting the system 300 with other systems and devices. The system 300 includes an input interface 301 configured to accept a stream of acoustic frames representing features of an audio input from input device 303. The input device 303 can be a microphone. Additionally, or alternatively, the computer-based linguistic system 300 can receive the acoustic signals from various other types of input interfaces. In some embodiments, the system 300 includes an audio interface configured to the stream of acoustic frames from acoustic input devices 303. In some other embodiments, the input interface includes a network interface controller (NIC) 305 configured to stream of acoustic frames 309, via network 307, which can be one or combination of wired and wireless network.

The network interface controller (NIC) 305 is adapted to connect the system 300 through a bus 311 to the network 307 connecting the system 300 with sensing devices, for example, input device 303 such as the microphone. Additionally, or alternatively, the system 300 can include a human machine interface (HMI) 313. The human machine interface 313 within the system 300 connects the system 300 to a keyboard 315 and pointing device 317, wherein the pointing device 317 can include a mouse, trackball, touchpad, joy stick, pointing stick, stylus, or touchscreen, among others.

The system 300 includes a processor 319 configured to execute stored instructions 321, as well as a memory 323 that stores instructions that are executable by the processor 319. The processor 319 can be a single core processor, a multi-core processor, a computing cluster, or any number of other configurations. The memory 323 can include random access memory (RAM), read only memory (ROM), flash memory, or any other suitable memory systems. The processor 319 can be connected through the bus 323 to one or more input and output devices.

The instructions 321 can implement a method for transcribing an audio input, according to some embodiments. To that end, the computer memory 323 stores the neural network 103, the metric calculation module 107, the classifier module 109, a decision module 111, a gate 325, and end-of-utterance module 327. The neural network 103 obtains the audio input signal and is executed multiple times. Thus, the neural network 103 produces multiple transcriptions corresponding to the audio input. The metric calculation module 107 is configured to obtain the multiple transcriptions and determine a distribution of pairwise edit distances between the multiple transcriptions. Further, the metric calculation module 107 determines at least one feature of the distribution. The at least one feature may comprise mean, variance, or first four moments of the distribution. The classifier module 109 obtains the at least one feature and takes a legitimacy decision that classifies the audio input as legitimate or illegitimate based on the at least one feature of the distribution. Based on the legitimacy decision, the decision module 111 is configured to execute the neural network 103 without using dropout mechanism to produce final transcription when the audio input is classified as legitimate. The decision module 111 is further configured to execute a counter measure routine, when the input is classified as illegitimate. The counter measure routine indicates that the audio input is illegitimate.

In some embodiments, the linguistic system 300 is configured for recognition in a streaming/online manner. For example, the gate 325 is configured to partition the speech utterance into a set of acoustic sequences. For example, in some embodiments the gate 325 is implemented as part of the input interface 301 partitioning the speech during its conversion. The length of each acoustic sequence in the set can be the same or can vary based on the features of the pronounced speech. In such a manner, the linguistic system 300 transcribes input acoustic sequences in a streamline manner. In some embodiments, the gate 325 partitions the speech utterance into blocks of acoustic signals, such that the input interface receives one block of acoustic signal at the time. For example, the gate 325 can be a voice activity detection module removing non-speech acoustic inputs.

In some embodiments, the memory 323 also stores an end-of-utterance module 327 configured to detect the end of the speech utterance. Different embodiments use different techniques to implement the end-of-utterance module 327. For example, some embodiments use speech activity detection (SAD) module to detect the end of an utterance or a combination of SAD and an auxiliary end point detection system.

The linguistic system 300 includes an output interface 329 configured to output the transcription outputs of the system 300. For example, if a transcription output represents a character, the output interface 329 outputs character by character. Similarly, if the transcription output represents a word, the output interface 329 outputs word by word. Additionally, or alternatively, in one embodiment, the output interface 329 is configured to accumulate a set of transcription outputs to form a word and output each word in the speech utterance individually. Further, in one embodiment the output interface is configured to output each transcription output individually or together with other outputs.

In some embodiments, the output interface 329 can display the transcription outputs on a display device 331, store the transcription outputs into storage medium and/or transmit the transcription outputs over the network 307. Examples of a display device 331 include a computer monitor, television, projector, or mobile device, among others. The system 300 can also be connected to an application interface 333 adapted to connect the system 300 to an external device 335 for performing various tasks.

Figures 4A, 4B, 4C, 4D, 4E:
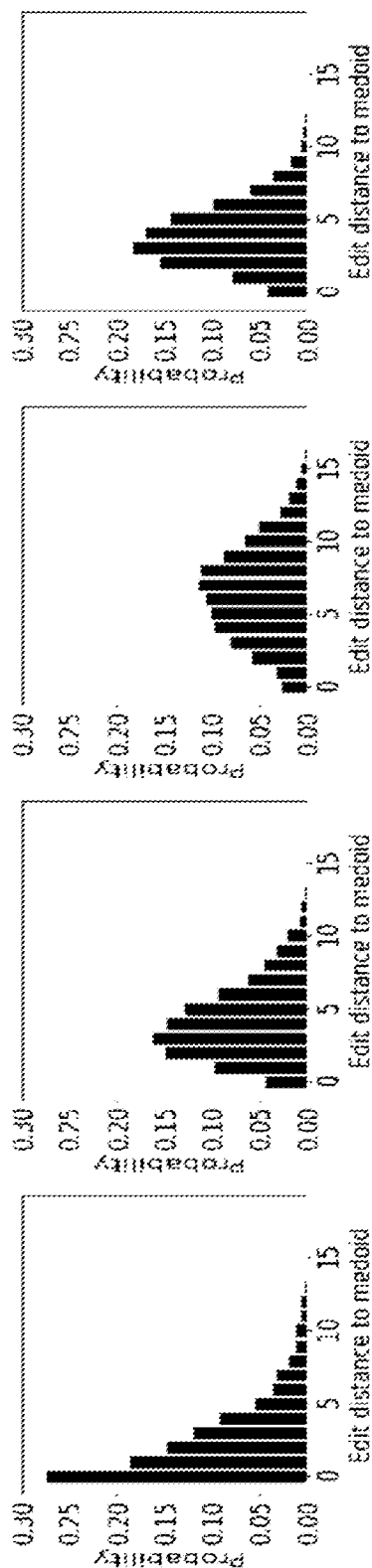
FIG. 4A illustrates an exemplary mean uncertainty distribution of original training samples.
FIG. 4B illustrates an exemplary mean uncertainty distributions of adversarial samples created with the vanilla Carlini and Wagner (CW) attack while using a defense dropout rate of 0.05.
FIG. 4C illustrates an exemplary mean uncertainty distributions of adversarial samples created with the vanilla CW attack while using a defense dropout rate of 0.1.
FIG. 4D illustrates an exemplary mean uncertainty distribution of adversarial samples created with a dropout robust attack while using a defense dropout rate of 0.1.
FIG. 4E shows Table 2 that illustrates detection accuracy of various attacks using three different binary classifiers.

Further, FIG. 4 illustrates mean empirical distribution of distances to medoid for original audio samples and adversarial audio samples from different attacks. The mean distributions are computed by averaging the empirical distributions of such distances over all samples in the training set: for each sample in the training set, an empirical distribution is obtained, which indicates the frequency of each distance to medoid for all outputs stemming for all dropout realizations; these distributions are then averaged over all samples. The defense dropout rate used when obtaining each dropout realization is denoted by p. In the distribution graphs, the Y axis represents the frequency of a given distance to the medoid among all dropout realizations, and the X axis represents edit distances between multiple transcriptions associated with the dropout realizations for a given audio input and the medoid transcription for that audio input. FIG. 4A illustrates an exemplary mean uncertainty distribution over all the original training samples, where the defense dropout rate is set to 0.05. For original, legitimate samples, it can be observed that the most frequent edit distance between the medoid transcription and other transcriptions (where all transcriptions are obtained by applying various dropout realizations to the neural network) is 0: over 25% of dropout realizations lead to the same transcription as the medoid; further a decreasing distribution can be observed, with about 18% of transcriptions at edit distance equal to 1 of the medoid, about 15% at edit distance equal to 2 of the medoid, and yet smaller percentages for larger distances.

FIGS. 4B-4C illustrate exemplary mean uncertainty distributions of the adversarial samples created with the vanilla CW attack while using a defense dropout rate of 0.05 and 0.1, respectively. In FIG. 4B, it can be observed that the shape of the distribution changes on average compared to FIG. 4A, with the mass moving further to the right, indicating that transcriptions obtained by multiple dropout realizations are further away from the medoid for adversarial examples than they are for legitimate examples. When increasing the defense dropout rate to 0.1 as in FIG. 4C, the mass moves further to the right.

Further, above discussed adversarial attacks are typically constructed to fool a system used in practice, which in general means that the system does not use dropout at inference time, even if it has been trained using dropout. Such attacks are thus constructed based on systems that do not involve dropout. However, adversaries may use an adversarial attack that would include a dropout mechanism when crafting their attack, with the intention to fool a defense mechanism such as the one described in the present disclosure. Such attacks are referred to as dropout robust attacks from hereon. The dropout robust attacks modify existing attacks such as CW attack to include dropout during construction of the adversarial audio input, in order to make these attacks less likely to be detected by a defense based on dropout. The dropout robust attack manipulates the ASR engine to transcribe the adversarial audio input as the target sentence t both with and without dropout turned on at inference time. The dropout robust attack can be built by minimizing a loss function formulated as:

$$\min_{\delta} c_1 l(x+\delta, t) + c_2 l_p(x+\delta, t)$$
$$\text{s.t. } dB(\delta) \le dB(x) - \tau,$$

where l is the recognition loss function used in the original CW attack without dropout, and $l_p(x+\delta, t)$ is a loss function measuring the recognition error for the network processing the adversarial example $x+\delta$ as input with a dropout rate of p under the assumption that the correct transcription should be t. Dropout may be applied to all or a subset of all layers.

FIG. 4D illustrates an exemplary mean uncertainty distribution of the adversarial samples created with the dropout robust (DR) attack while using a dropout rate of 0.1 both for the defense and for creating the adversarial examples: it can be observed that making the attack dropout robust moves the distribution back slightly to the left, although its shape still has different characteristics than that of a distribution obtained with a legitimate example.

Further, FIG. 4E shows Table 2 that illustrates detection accuracy of the various attacks using three different binary classifiers. p denotes the dropout rate used in the defense. All values are in percentages. Bold values in the Table 1 indicate the best results. The accuracy of the linguistic system to determine legitimacy of the audio input is associated with dropout rate (i.e. dropout probability p). As the dropout rate increases, forgery success rate of the adversarial attack decreases i.e. with higher dropout rate the adversarial sample are not transcribed as the desired target or as intended by the adversaries.

Further, different binary classifiers such as DS, SVM-4, and SVM-F are trained using 70-30 train-test split on a subset of 400 samples of the CommonVoice dataset consisting of 200 original samples and 200 adversarial samples that we randomly selected. The average duration of each audio sample is approximately 5 seconds. The defense results with higher defense dropout rate 0.1 for the vanilla CW attack and the dropout robust attack (DR) are shown in the second and third columns of Table 1. It can be observed from the Table 1 that using a defense dropout rate of 0.1 in conjunction with an SVM-4 with a training set consisting of original samples and dropout robust adversarial samples, works best.

Further, as can be observed from the Table 1, the defense results for the noise robust (NR) attack and the imperceptible attack (IA) are similar to the results for the CW. These attacks were not dropout robust and the mean uncertainty distributions of the adversarial samples are similar to that of the CW in FIG. 4C. Thus, training through dropout has the largest effect on the geometry of the uncertainty distributions produced (FIGS. 4A-4D). The defense results for urban sound (US) attack are shown in the last column of Table 1. Thus, the linguistic system using dropout mechanism as disclosed in the present disclosure effectively detects adversarial attacks and provides an effective defense mechanism against the adversarial attacks.

In an example embodiment, a non-English speaking user streams an English speech of a political leader. In order to understand the speech in a native language of the user, the user may use a linguistic system (for example, ASR system) that transcribes audio signals of the speech to the native language understood by the user. It is possible that an adversary (for example, terrorists) may have perturbed audio signals of the recorded speech. The perturbation can cause the linguistic system to transcribe the recorded speech as intended by the adversaries. In absence of a defense mechanism to detect adversarial audio attack, the malicious transcription of the speech may cause chaos. To that end, the present disclosure proposes the linguistic system 100 that uses a dropout mechanism to detect the adversarial attacks.

The linguistic system 100 initially generates multiple transcriptions of the audio signals associated with the speech based on the number of dropout realizations. Suppose the number of dropout realizations is 50, in this case, the linguistic system 100 decodes the audio signal 50 times and generates multiple transcriptions in each realization. The linguistic system 100 then determines a distribution of pairwise edit distances between the multiple transcriptions with respect to the medoid transcription. The linguistic system 100 further derives the one or more features of the distribution of pairwise edit distances. In order to detect the attack, the linguistic system 100 uses a classifier that uses the at least one feature to determine legitimacy of the audio input.

When the linguistic system 100 detects the audio attack, the linguistic system 100 notifies the user about illegitimate transcription. The indication may be a notification on a display device and may comprise a message regarding illegitimacy of the transcription of the speech. The message may be in the native language that is understood by the user. On the other hand, when the audio input is legitimate, the linguistic system transcribes the audio input (the speech) accordingly.

In another example embodiment, a user may be living in a smart home where a smart home system enables the user to use voice commands in order to control different elements of the smart home. For example, the user may give a voice command say "switch on the lights" to the system to control switching on or off of lights in a room, or the user may give voice command say "play music" to the system to play music on a music system in the room. It is possible that the adversaries may use an adversarial attack such that the smart home system may add noise to the received voice command which manipulates the smart home system to execute malicious activity. For example, the adversarial attack on the voice command "Switch on the light" may cause the smart home system to actuate a different action for example "Play music" instead of switching on the lights. Adversaries may broadcast via a radio or a TV program a speech signal that is perceived by a user as innocuous, but is in fact an adversarial attack targeted at the smart home system to execute malicious activity. For example, the narration of a commercial such as "Buy product X" could be modified such that it triggers the smart home system and is recognized by that system as "Open the garage door". To that end, the present disclosure proposes the linguistic system 100 that provides defense against adversarial attacks on the voice commands. The linguistic system 100 uses the dropout mechanism to provide defense against such adversarial attacks.

The smart home system may be implemented with the proposed linguistic system 100. Therefore, when the voice command from the user or generally some audio signal that triggers the smart home system is received by the smart home system it is first provided to the proposed linguistic system 100 to classify the voice command as legitimate or illegitimate. On receiving the voice command, the linguistic system 100 produces multiple internal transcriptions of the voice command by executing the neural network 103 multiple times. The linguistic system 100 then uses the metric calculation module 107 to determine a distribution of pairwise edit distances between the multiple internal transcriptions. The metric calculation module 107 further determines at least one feature of the distribution. The linguistic system 100 uses the at least one feature of the distribution to determine legitimacy of the voice command. To that end, the linguistic system 100 uses the classifier module 109 to take the legitimacy decision. The legitimacy decision is further used by the decision module 111 to perform different actions depending upon the legitimacy decision. When the classifier classifies the voice command as a legitimate input/voice command, the decision module 111 executes the neural network 103 without dropout to produce a final legitimate voice command. The decision module 111 may forward the legitimate voice command to the smart home system which executes action corresponding to the voice command.

On the other hand, when the classifier module 109 classifies the voice command as a legitimate input/voice command, the decision module 111 executes a counter measure routine. The counter measure routine may indicate the smart home system to stop execution of the voice command. Further, the counter measure routine may indicate the smart home system to generate an alarm to indicate attack on the voice command or security breach. For example, the smart home system may provide an audio signal stating that the voice command is illegitimate, or the system is under attack, or the likes.

Embodiments

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments.

However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A linguistic system for transcribing an input, the linguistic system comprising:
an input interface configured to accept the input;
a memory configured to store a neural network trained to transcribe the input to produce a transcription;
a processor configured to:
execute the neural network multiple times while varying weights of at least some nodes of the neural network to produce multiple transcriptions of the input;
determine a distribution of pairwise distances of the multiple transcriptions;
determine at least one feature of the distribution of pairwise distances of the multiple transcriptions;
submit the at least one feature of the distribution to a classifier to classify the input as a legitimate input or an illegitimate input; and
an output interface configured to:
output a transcription of the input, when the input is classified as legitimate; and otherwise
execute a counter-measure routine, when the input is classified as the illegitimate input.

2. The linguistic system of claim 1, wherein the processor is further configured to vary weights of the at least some nodes of the neural networks by setting the weights of the at least some nodes of the neural network to zero.

3. The linguistic system of claim 1, wherein the at least one feature comprises one of: a mean of the distribution, a variance of the distribution, or first four moments of the distribution.

4. The system of claim 1, wherein the distribution of the pairwise distances comprise a distribution of distances between a medoid transcription and the multiple transcriptions, and wherein the medoid transcription is a transcription with the smallest average distance to all other transcriptions of the multiple transcriptions.

5. The linguistic system of claim 4, wherein the distances are edit distances between the medoid transcription and the multiple transcriptions.

6. The linguistic system of claim 1, wherein the neural network produces each transcription subject to one or more language models.

7. The linguistic system of claim 1, wherein the input to the linguistic system comprises at least one of: an audio signal, a video signal, or an image signal.

8. The linguistic system of claim 1, wherein to classify the input, the classifier is configured to determine a probability of legitimacy based on the at least one feature of distribution, and wherein the classifier is further configured to compare the probability of the legitimacy with a predetermined threshold.

9. The linguistic system of claim 1, wherein the counter measure routine when executed notifies a user about illegitimacy of the input.

10. The linguistic system of claim 1, wherein the input includes a speech utterance.

11. The linguistic system of claim 1, wherein the multiple transcription includes a no-dropouts transcription performed without dropouts by transcribing the input using stored weights of the nodes of the neural network, and wherein the output interface outputs the no-dropouts transcription when the input is legitimate.

12. The linguistic system of claim 1, wherein the processor, upon classifying the input as legitimate, is configured to transcribe the input using stored weights of the nodes of the neural network to produce a no-dropouts transcription performed without dropouts, and wherein the output interface outputs the no-dropouts transcription.

13. An automatic speech recognition system including the linguistic system of claim 1.

14. A control system configured to control a machine based on the transcription outputted by the linguistic system of claim 1.

15. A method for transcribing an input, wherein the method uses a processor coupled with stored neural network and stored instructions implementing the method, wherein the instructions, when executed by the processor carry out steps of the method, comprising:
executing the neural network multiple times while varying weights of at least some nodes of the neural network to produce multiple transcriptions of the input;
determining a distribution of pairwise distances of the multiple transcriptions;
determining at least one feature of the distribution of pairwise distances of the multiple transcriptions;
submitting the at least one feature of the distribution to a classifier to classify the input as a legitimate input or an illegitimate input;
outputting a transcription of the input, when the input is classified as legitimate; and otherwise
executing a counter-measure routine, when the input is classified as the illegitimate input.

16. The method of claim 15, wherein the input includes a speech utterance.

17. The method of claim 15, wherein the method further comprises:
varying weights of the at least some nodes of the neural networks by setting the weights of the at least some nodes of the neural network to zero.

18. A non-transitory computer readable storage medium embodied thereon a program executable by a processor for performing a method for transcribing an input, the method comprising:
executing the neural network multiple times while varying weights of at least some nodes of the neural network to produce multiple transcriptions of the input;
determining a distribution of pairwise distances of the multiple transcriptions;
determining at least one feature of the distribution of pairwise distances of the multiple transcriptions;
submitting the at least one feature to a classifier to classify the input as a legitimate input or an illegitimate input;
outputting a transcription of the input, when the input is classified as legitimate; and otherwise executing a counter-measure routine, when the input is classified as the illegitimate input.

* * * * *